Patented Sept. 9, 1941

2,255,263

UNITED STATES PATENT OFFICE 2,255,263

THIXOTROPIC PIGMENT AND PAINT

Guy C. Marcot, Montclair, N. J., assignor to Interchemical Corporation, New York, N. Y., a corporation of Ohio No Drawing. Application January 24, 1939, Serial No. 252,545

15 Claims. (Cl. 134—39)

This invention relates to thixotropic paints, and to pigments for use therein, and has particular reference to pigments adapted to increase the thixotropic characteristics of paints in which they are dispersed, which pigments are characterized by being coated with both hydrophilic and organophilic coating agents.

When a pigment or filler is incorporated into an oil or oleoresinous vehicle a suspension of the pigment in the vehicle results. The pigment suspension possesses both viscosity and yield value. The degree of flocculation determines to a large extent the yield value and consequently the consistency characteristics of the suspension if there is no chemical reaction or other factor tending to produce a structure in the vehicle. The pigment exhibits a tendency to separate out to the bottom of the container, thus concentrating itself to a more or less compact mass, upon standing undisturbed. Thus, when a pigment is completely deflocculated in a vehicle a suspension of relatively low yield value results and the pigment will separate and form a very compact mass at the bottom of the container, which is very difficult to reincorporate. If, on the other hand, the pigment is flocculated, the paint will have a high yield value and the mass of pigment settling out by gravitation will be quite bulky and easily reincorporated.

Changes in consistency and in flocculation of pigment may sometimes be accomplished by incorporation of water into a paint, depending on the relative degree of wetting of the pigment by the oil and by the water. If the pigment is organophilic (preferentially wet by the oil) the paint remains thin and unchanged in consistency when water is incorporated, but if the pigment is hydrophilic (preferentially wet by water), the paint increases in consistency and yield value on water addition, even forming a stiff paste where the pigment is sufficiently hydrophilic, due to the flocculation of pigment particles.

If such a flocculated pigment mixture thins down on stirring and always thickens up again on standing, it is said to be "thixotropic." This condition is not to be confused with chemical reactions where structure-like products such as soaps are formed, producing a permanent thickening of the material. In such a case stirring sometimes causes a slight thinning down, but no subsequent rebuilding follows upon standing.

Thixotropy is not fully understood. A thixotropic paint, however, behaves as though a submicroscopic gel structure forms between the floccullated pigment particles. If the pigment is not flocculated this structure evidently cannot form; hence flocculation is a prerequisite for thixotropy. The thixotropic gel structure is an orientated one, hence stirring disarranges it and the forces holding its particles together are lessened; as a consequence yield value drops. On standing, the gel particles reorientate and the yield value is restored to its former amount.

For many purposes thixotropic suspensions of pigments in vehicles are highly desirable. Such paints are characterized by good pigment suspension properties, good brushing and spreading properties and the ability of the film to set up to a non-sagging film soon after application to the surface.

The tendency of a pigment to flocculate when water is added to a dispersion or suspension of it in an oil or oleoresinous vehicle is dependent on the nature of the vehicle to some extent but to an even larger extent, on the affinity of the surface of the pigment particles for water. Very hydrophilic pigments tend to form pigment-vehicle systems that are so sensitive to the addition of water that excessive bodying results and the finished paint consistency cannot be kept uniformly within practical limits. On the other hand, many pigments not hydrophilic in nature, have so little inherent affinity for water that the addition of water to suspensions of such pigments in oleoresinous vehicles results in no bodying or other changes in paint characteristics, such as are produced by pigment flocculation. This is particularly true of the zinc sulfide pigments.

It has been observed that oily and oleoresinous paints which contain small percentages of water, and which also contain pigments easily wet by water, have marked thixotropic properties. In order to obtain thixotropic paints by imparting water sensitivity to these pigments, it has been proposed to coat the pigment particles with very small percentages of water soluble carbohydrate gums such as gum arabic, gum tragacanth and the like, which are readily water soluble but are substantially immiscible with the oil vehicle; and certain of my co-workers have suggested the use of salts of amino acids, in order to obtain certain results not obtainable with the carbohydrate gums.

Such pigments can be used to produce acceptable thixotropic paints with many paint vehicles, but certain objections are open to their use. Fine control of thixotropic characteristics is unattainable, so that certain desirable paint vehicles, which exhibit thixotropy over only a narrow range, cannot be used; it is impossible to reduce the water sensitivity of the pigment, since the coatings are adsorbed on the pigment; and the water-sensitivity of the pigment often produces difficulties in dispersion of the pigment into the oleoresinous vehicle.

I have discovered that normally water insensitive pigments can be rendered sufficiently water sensitive to yield thixotropic paints, while maintaining the desirable dispersion qualities of the untreated pigments, by treating such pigments with a hydrophilic coating material combined with organophilic coating material in sufficient quantity so that on dispersing in the presence of an oleoresinous or oily vehicle with water, the pigment is still preferentially wet with oil, while on standing, the hydrophilic coating adsorbs sufficient water to yield the thick flocculated structure characteristic of thixotropic systems.

My method of treating pigments has certain advantages over old methods. By properly proportioning the two types of coatings, the thixotropic characteristics can be controlled very easily and be reduced or increased as tests indicate. The thixotropic characteristics can be controlled with complete accuracy, so that a wider range of paint vehicles can be used with my new pigments. The use of an organophilic coating overcomes the effect of the hydrophilic coating insofar as dispersability of pigment in oily vehicles is concerned; as a result, substantial vehicle changes to improve dispersability are not necessary.

I may use the corbohydrates and the proteins heretofore used as the hydrophilic coating on my pigment; but I prefer to use sodium silicate. This coating agent is far more water sensitive than the materials used heretofore, yielding by itself a short puffy paint which does not break down on stirring. However, it distributes very readily in the slurry, and is easier to handle than the prior art hydrophilic coatings.

The hydrophobic coating may be any hydrophilic organic compound, such as oleic and other fatty acids, diglycol laurate and similar fatty acid esters, fatty oils and the like. I prefer to use materials such as oleic acid, which distribute rapidly and readily in the slurry.

In general, I use from 0.05 to 0.5% of water sensitive coating material, and similar amounts of hydrophobic coating material. With sodium silicate, I obtain most desirable results when it is used with slightly greater quantities of hydrophobe coating.

As an example of my invention, I took 25 tons of calcined wet milled lithopone, in a water slurry containing 35% solids, and treated it with 163 pounds of sodium silicate solution (containing 50 pounds of sodium silicate having a composition approximating $Na_2O.3.6SiO_2$); after mixing, 100 pounds of oleic acid was added, and the slurry was remixed and filtered and the pigment was washed, dried an disintegrated. Because of the presence of alkaline zinc and calcium salts in the slurry, the silicate was probably precipitated on the pigment as a hydrophilic mixture of silica gel and insoluble zinc or calcium silicate, while the oleic acid probably was precipitated as hydrophobic zinc or calcium soaps.

This pigment showed excellent thixotropic properties in the following paint:

| | Grams |
|---|---|
| Lithopone of the example | 440 |
| Whiting | 110 |
| Oleoresinous varnish | 110 |
| Alkali refined linseed oil | 14 |
| Kerosene | 25 |
| Mineral spirits | 23 | was ground, and thinned with

| | |
|---|---|
| Linseed oil | 19 |
| Limed rosin gloss oil | 17 |
| Mineral spirits | 52 |
| Japan drier | 5 | after which 1% of water was mixed into the paint.

The varnish used was made by cooking 100 pounds of ester gum with 10 gallons of linseed oil and 25 gallons of China-wood oil in conventional fashion to a short string, and reducing to 60% nonvolatile with mineral spirits.

By adjusting the ratio of silicate to oleic acid in the example, varying degrees of thixotrophy can be obtained in the paint shown, and in others; and slight variations in the thixotropic properties obtained are quite easily obtained.

My method yields very satisfactory results with all pigments and fillers such as zinc sulfied, whiting, blanc fixe, and the like, which do not normally produce thixotropic paints.

I claim:

1. A pigment the individual particles of which are coated with from 0.05 to 0.5 percent of a water sensitive coating agent, and from 0.05 to 0.5 percent of a water-repellant coating agent, the agents being present in such proportions that the pigment is wet preferentially by oil on agitation in an oil-water system.

2. Lithopone the individual particles of which are coated with from 0.05 to 0.5 percent of a water sensitive coating agent, and from 0.05 to 0.5 percent of a water-repellant coating agent, the agents being present in such proportions that the pigment is wet preferentially by oil on agitation in an oil-water system.

3. A pigment the individual particles of which are coated with from 0.05 to 0.5 percent of a hydrophilic silicate and from 0.05 to 0.5 percent of a water-repellant coating agent, the agents being present in such proportions that the pigment is wet preferentially by oil on agitation in an oil-water system.

4. Lithopone the individual particles of which are coated with from 0.05 to 0.5 percent of a hydrophilic silicate and from 0.05 to 0.5 percent of a water-repellant coating agent, the agents being present in such proportions that the pigment is wet preferentially by oil on agitation in an oil-water system.

5. A paint possessing thixotropic properties comprising a vehicle of the oily or oleoresinous type, a small percentage of water, and a pigment the individual particles of which are coated with from 0.05 to 0.5 per cent of a water sensitive coating agent and from 0.05 to 0.5 percent of a water-repellant coating agent, the agents being present in such proportions that the pigment is wet preferentially by oil on agitation in an oil-water system.

6. A paint possessing thixotropic properties comprising a vehicle of the oily or oleoresinous type, a small percentage of water, and lithopone the individual particles of which are coated with from 0.05 to 0.5 percent of a water sensitive coating agent and from 0.05 to 0.5 percent of a water-repellant coating agent, the agents being present in such proportions that the pigment is wet preferentially by oil on agitation in an oil-water system.

7. A paint possessing thixotropic properties comprising a vehicle of the oily or oleoresinous type, a small percentage of water, and a pigment the individual particles of which are coated with from 0.05 to 0.5 percent of a hydrophilic silicate, and from 0.05 to 0.5 percent of a water repellant coating agent, the agents being present in such proportions that the pigment is wet preferentially by oil on agitation in an oil-water system.

8. A paint possessing thixotropic properties comprising a vehicle of the oily or oleoresinous type, a small percentage of water, and lithopone the individual particles of which are coated with from 0.05 to 0.5 percent of a hydrophilic silicate, and from 0.05 to 0.5 percent of a water-repellant coating agent, the agents being present in such proportions that the pigment is wet preferentially by oil on agitation in an oil-water system.

9. A zinc sulfide pigment the individual particles of which are coated with from 0.05 to 0.5 percent of a water sensitive coating agent, and from 0.05 to 0.5 percent of a water-repellant coating agent, the agents being present in such proportions that the pigment is wet preferentially by oil on agitation in an oil-water system.

10. A zinc sulfide pigment the individual particles of which are coated with from 0.05 to 0.5 percent of a hydrophilic silicate and from 0.05 to 0.5 percent of a water-repellant coating agent, the agents being present in such proportions that the pigment is wet preferentially by oil on agitation in an oil-water system.

11. A paint possessing thixotropic properties comprising a vehicle of the oily or oleoresinous type, a small percentage of water, and a zinc sulfide pigment the individual particles of which are coated with from 0.05 to 0.5 percent of a water sensitive coating agent and from 0.05 to 0.5 percent of a water-repellant coating agent, the agents being present in such proportions that the pigment is wet preferentially by oil on agitation in an oil-water system.

12. A paint possessing thixotropic properties comprising a vehicle of the oily or oleoresinous type, a small percentage of water, and a zinc sulfide pigment the individual particles of which are coated with from 0.05 to 0.5 percent of a hydrophilic silicate, and from 0.05 to 0.5 percent of a water repellant coating agent, the agents being present in such proportions that the pigment is wet preferentially by oil on agitation in an oil-water system.

13. A pigment which produces thixotropic paints when admixed with oleoresinous vehicles containing water, which comprises a pigment which, when untreated, does not produce thixotropic paints, the individual particles of which carry a coating thereon comprising from 0.05 to 0.5 percent of a hydrophilic coating material which renders the pigment excessively water-sensitive, and relatively small percentages of a hydrophobic coating material in such proportion to the hydrophilic material as to reduce the water-sensitivity of the pigment to a range desirable for thixotropic paints and to cause the pigment to be wet preferentially by oil on agitation in an oil-water system.

14. A zinc sulfide pigment which produces thixotropic paints when admixed with oleoresinous vehicles containing water, the individual particles of which carry a coating thereon comprising from 0.05 to 0.5 percent of a hydrophilic coating material which renders the pigment excessively water-sensitive, and relatively small percentages of a hydrophobic coating material in such proportion to the hydrophilic material as to reduce the water-sensitivity of the pigment to a range desirable for thixotropic paints and to cause the pigment to be wet preferentially by oil on agitation in an oil-water system.

15. The pigment of claim 14, in which the hydrophilic coating is a hydrophilic silicate.

GUY C. MARCOT.

CERTIFICATE OF CORRECTION.

Patent No. 2,255,263.  September 9, 1941.
GUY C. MARCOT.

It is hereby certified that error appears in the printed specification of the above numbered patent requiring correction as follows: Page 1, second column, line 6, for "floccullated" read --flocculated--; page 2, first column, line 45, for "corbohydrates" read --carbohydrates--; and second column, line 14-15, for "Mineral spirits ----------------- 23
   was ground, and thinned with"

read

--Mineral spirits ---------------- 13
   was ground, and thinned with -- ;

line 27, for "thixotrophy" read --thixotropy--; and that the said Letters Patent should be read with this correction therein that the same may conform to the record of the case in the Patent Office.

Signed and sealed this 11th day of November, A. D. 1941.

(Seal)

Henry Van Arsdale,
Acting Commissioner of Patents.